United States Patent
Gao et al.

(10) Patent No.: US 7,346,811 B1
(45) Date of Patent: Mar. 18, 2008

(54) SYSTEM AND METHOD FOR DETECTING AND ISOLATING FAULTS IN A COMPUTER COLLABORATION ENVIRONMENT

(75) Inventors: Changju Gao, Provo, UT (US); Robert Wipfel, Draper, UT (US)

(73) Assignee: Novell, Inc., Provo, UT (US)

( * ) Notice: Subject to any disclaimer, the term of this patent is extended or adjusted under 35 U.S.C. 154(b) by 574 days.

(21) Appl. No.: 10/917,621

(22) Filed: Aug. 13, 2004

(51) Int. Cl.
*G06F 11/00* (2006.01)

(52) U.S. Cl. .......................................... 714/47; 714/48

(58) Field of Classification Search ................ 714/47, 714/44, 4, 48; 709/224
See application file for complete search history.

(56) References Cited

U.S. PATENT DOCUMENTS

| | | | |
|---|---|---|---|
| 6,088,727 A | 7/2000 | Hosokawa et al. | |
| 6,151,688 A | 11/2000 | Wipfel et al. | |
| 6,338,112 B1 | 1/2002 | Wipfel et al. | |
| 6,353,898 B1 | 3/2002 | Wipfel et al. | |
| 6,446,218 B1 | 9/2002 | D'Souza | |
| 6,460,149 B1 | 10/2002 | Rowlands et al. | |
| 6,467,050 B1 | 10/2002 | Keung | |
| 6,477,583 B1 | 11/2002 | Zayas et al. | |
| 6,728,896 B1 * | 4/2004 | Forbes et al. | 714/4 |
| 6,748,381 B1 * | 6/2004 | Chao et al. | 707/10 |
| 6,965,936 B1 * | 11/2005 | Wipfel et al. | 709/224 |
| 7,055,053 B2 * | 5/2006 | Saika | 714/4 |
| 7,124,320 B1 * | 10/2006 | Wipfel | 714/13 |
| 2002/0157035 A1 | 10/2002 | Wong et al. | |
| 2003/0051187 A1 | 3/2003 | Mashayekhi et al. | |
| 2003/0079154 A1 | 4/2003 | Park et al. | |
| 2003/0177411 A1 | 9/2003 | Dinker et al. | |
| 2004/0078652 A1 | 4/2004 | Tapper et al. | |
| 2005/0283641 A1 * | 12/2005 | Clark et al. | 714/4 |

OTHER PUBLICATIONS

Werner Vogels / Dan Dumitriu / Ken Birman / Rod Gamache / Mike Massa / Rob Short / John Vert / Joe Barrera / Jim Gray; The Design and Architecture of the Microsoft Cluster Service; A Practical Approach to High-Availability and Scalability; Jun. 23-25, 1998; 10 pages; Published in the Proceedings of FTCS '98 in Munich, Germany.

* cited by examiner

*Primary Examiner*—Dieu-Minh Le
(74) *Attorney, Agent, or Firm*—Haynes and Boone, LLP (57) ABSTRACT

A method and system are provided for use in a computer collaboration environment. In one example, the method includes identifying that a resource should be failed over from one computer to another computer within the environment. A history of the resource's execution within the cluster is examined, and the resource is failed over only if a risk assessment based on the history indicates that a risk level of loading the resource does not exceed an acceptable risk threshold.

28 Claims, 6 Drawing Sheets

SYSTEM AND METHOD FOR DETECTING AND ISOLATING FAULTS IN A COMPUTER COLLABORATION ENVIRONMENT

BACKGROUND

Computer collaboration systems (e.g., clusters), such as networked systems and distributed systems, enable a number of individual computers to work together to manage and provide resources and services. Such clusters may provide improved performance, such as higher availability, scalability, and reliability, as well as improved load-balancing, when compared with other systems. One feature of clusters is the ability to transparently move resources (i.e., "failover") from one computer to another (or a group of other computers) if a computer crashes, leaves the cluster, or otherwise becomes unavailable.

Clusters also have certain inherited problems. For example, one problem is a cluster's tendency to collapse or suffer a system-wide breakdown when faced with corrupted files, computer viruses, software defects, malicious attacks, and similar issues. This may occur when a problematic resource or service causes one computer in a cluster to crash and the remaining computers in the cluster crash as the resource or service is failed over from one computer to another.

SUMMARY

In response to these and other problems, in one embodiment, a method is provided for minimizing breakdown in a computer cluster containing a plurality of computers, wherein a resource is to be failed over from a first computer of the plurality of computers. The method comprised identifying that the first computer has failed while running the resource, tracing a failover history of the resource based on a log containing a history of the resource and the plurality of computers, identifying the existence of mitigating factors associated with the failover history based on the log, and determining whether to load the resource onto a second computer of the plurality of computers based on the failover history and mitigating factors.

DETAILED DESCRIPTION

This disclosure relates generally to computer collaboration environments and, more specifically, to a system and method for detecting and isolating faults in such environments.

It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
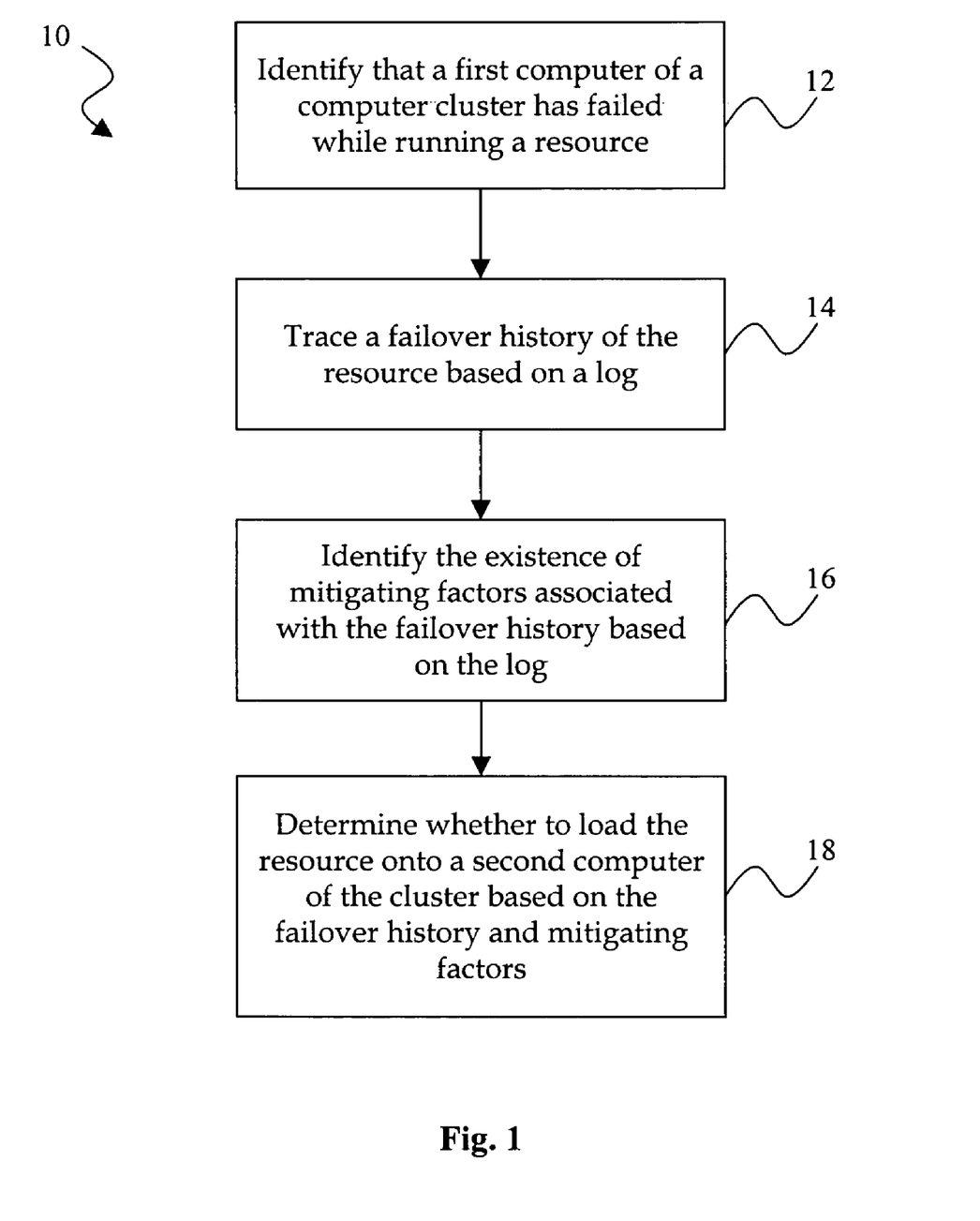
FIG. 1 is a flowchart of one embodiment of a method for detecting and isolating faults in a computer collaboration environment.

Referring to FIG. 1, in one embodiment, a method 10 enables a fault in a computer cluster to be detected and isolated. As will be described later in greater detail, the computer cluster includes multiple computers and the ability to failover a resource or service from a computer that is unavailable to a computer that is available. The unavailability may be due to any number of reasons, such as a crash or the removal of the computer from the cluster. For purposes of convenience, terms such as "resource," "service," and "task" may be used interchangeably herein to include any computer accessible or executable item that may be failed over from one computer to another computer, including such items as files and devices (e.g., printers), as well as services (e.g., tasks such as email processing, web page delivery, and responding to requests). As will be described later in greater detail with specific examples, the method 10 may be used to prevent the failover of a problematic resource from one computer to others in a cluster, and may prevent collapse of the cluster.

In step 12, identification of a failed computer occurs. As the computer was running a resource as the time of its failure, the resource may be failed over to another computer within the cluster. However, before failing over the resource to another computer, a failover history of the resource is traced based on log associated with the computer cluster in step 14. In the present example, the log includes a history of the resource and the computers within the cluster. In step 16, possible mitigating factors associated with the failover history are identified based on the log. In step 18, a determination is made as to whether to load the resource onto another computer based on the failover history and mitigating factors. If the determination identifies that the resource is safe to load, then the resource is failed over. If the determination indicates that the resource is not safe to load, then the resource is not failed over and another action may be performed (e.g., the resource may be quarantined or ignored).

Figure 2:
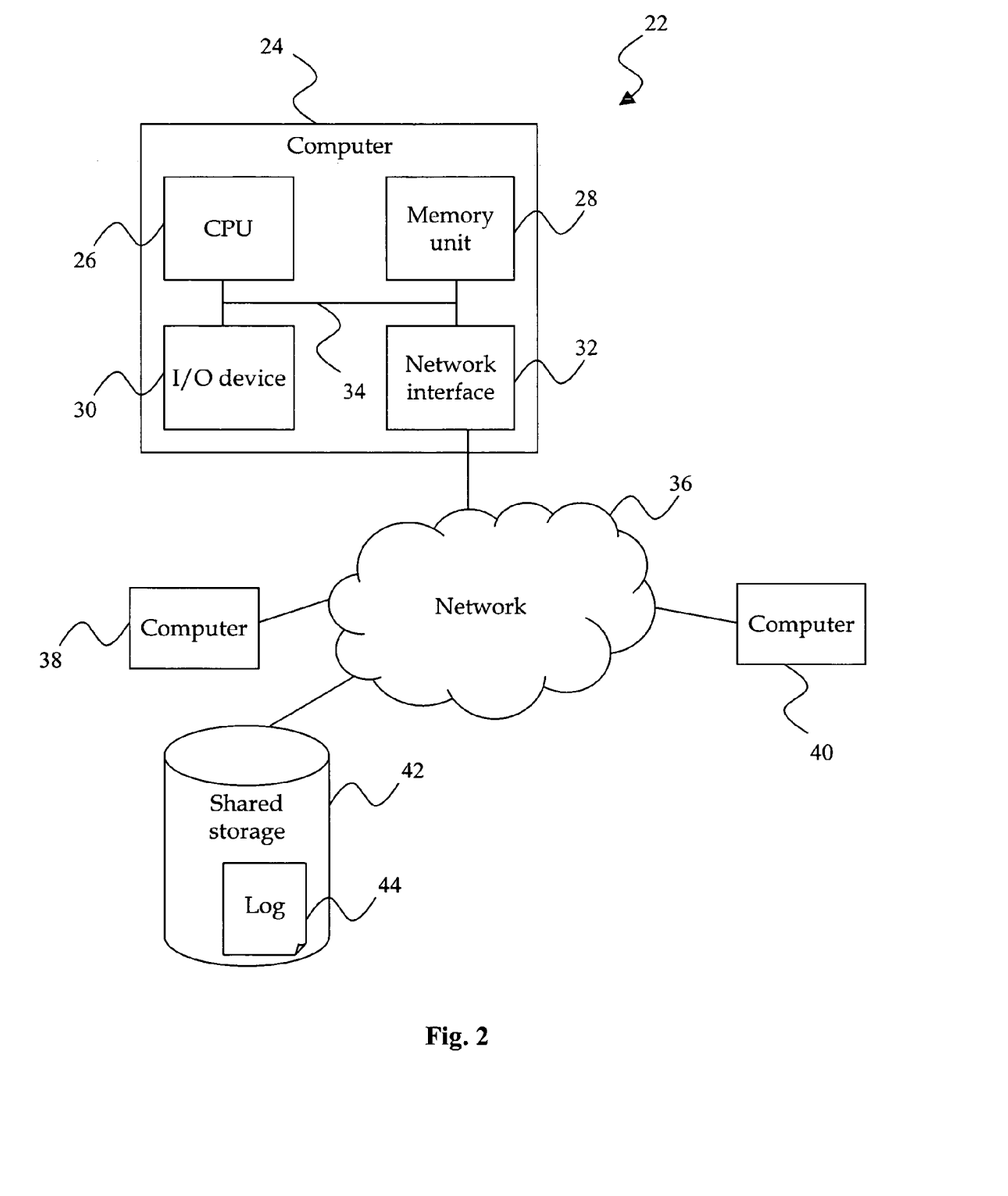
FIG. 2 is a diagram of an exemplary computer and network environment in which the method of FIG. 1 may be executed.

Referring now to FIG. 2, an exemplary computer environment 22, such as may be used to implement the method 10 of FIG. 1, is illustrated. The computer environment includes three computers 24, 38, and 40. For purposes of illustration, the computer 24 is illustrated in greater detail and may include a central processing unit ("CPU") 26, a memory unit 28, an input/output ("I/O") device 30, and a network interface 32. The network interface may be, for example, one or more network interface cards (NICs) that are each associated with a media access control (MAC) address. The components 26, 28, 30, and 32 are interconnected by a bus system 34. It is understood that the computer may be differently configured and that each of the listed components may actually represent several different components. For example, the CPU 26 may actually represent a multi-processor or a distributed processing system; the memory unit 28 may include different levels of cache memory, main memory, hard disks, and remote storage locations; and the I/O device 30 may include monitors, keyboards, and the like.

The computer 24 may be connected to a network 36. The network 36 may be, for example, a subnet of a local area network, a company wide intranet, and/or the Internet. Because the computer 24 may be connected to the network 36, certain components may, at times, be shared with the other computers 38 and 40. Therefore, a wide range of flexibility is anticipated in the configuration of the computer. Furthermore, it is understood that, in some implementations, the computer 20 may act as a server to other computers 38, 40. Each computer 24, 38, 40 may be identified on the network by an address (e.g., an IP address) and, in some instances, by the MAC address associated with the network interface of the relevant computer. In the present example, the computers 24, 38, and 40 form a cluster.

Each of the computers 24, 38, and 40 may be associated with multiple states, including a running state and a failed state. The running state indicates that the computer is functional and actively participating in the cluster. The failed state indicates that a computer that was previously in the running state is no longer participating in cluster activities and did not notify the other computers before such inactivity occurred. It is understood that these are exemplary states only and that other states may be used to indicate such computer status information.

Many different resources may be run by the computers 24, 38, and 40. Each resource may be associated with multiple states, including a loading state and a running state. The loading state indicates that a computer is in the process of making the resource available to users (which may be other computers, humans, etc.). If loading is successful, the resource enters the running state, which indicates that the resource is available to users. It is understood that these are exemplary states only and that other states may be used to indicate such resource status information.

The computer environment 22 also includes shared storage 42. The shared storage may be a standalone database, may be formed using portions of the memory units of one or more of the computers 24, 38, and 40, or may be any other memory accessible to the cluster. In the present example, a log 44 is stored within the shared storage, although it is understood that the log may be stored elsewhere. The log 44 may contain a history of the cluster's computers and resources. For example, the log 44 may contain time-based information linking a computer with a resource and detailing state changes for each computer and/or resource. The time-based information may include when a computer entered the running or failed states, as well as when each resource entered the loading or running states. Instructions for executing various steps or for implementing various functions disclosed in the present description may be stored on any computer readable medium, including the shared storage, one or more of the computers, or elsewhere.

Figure 3:
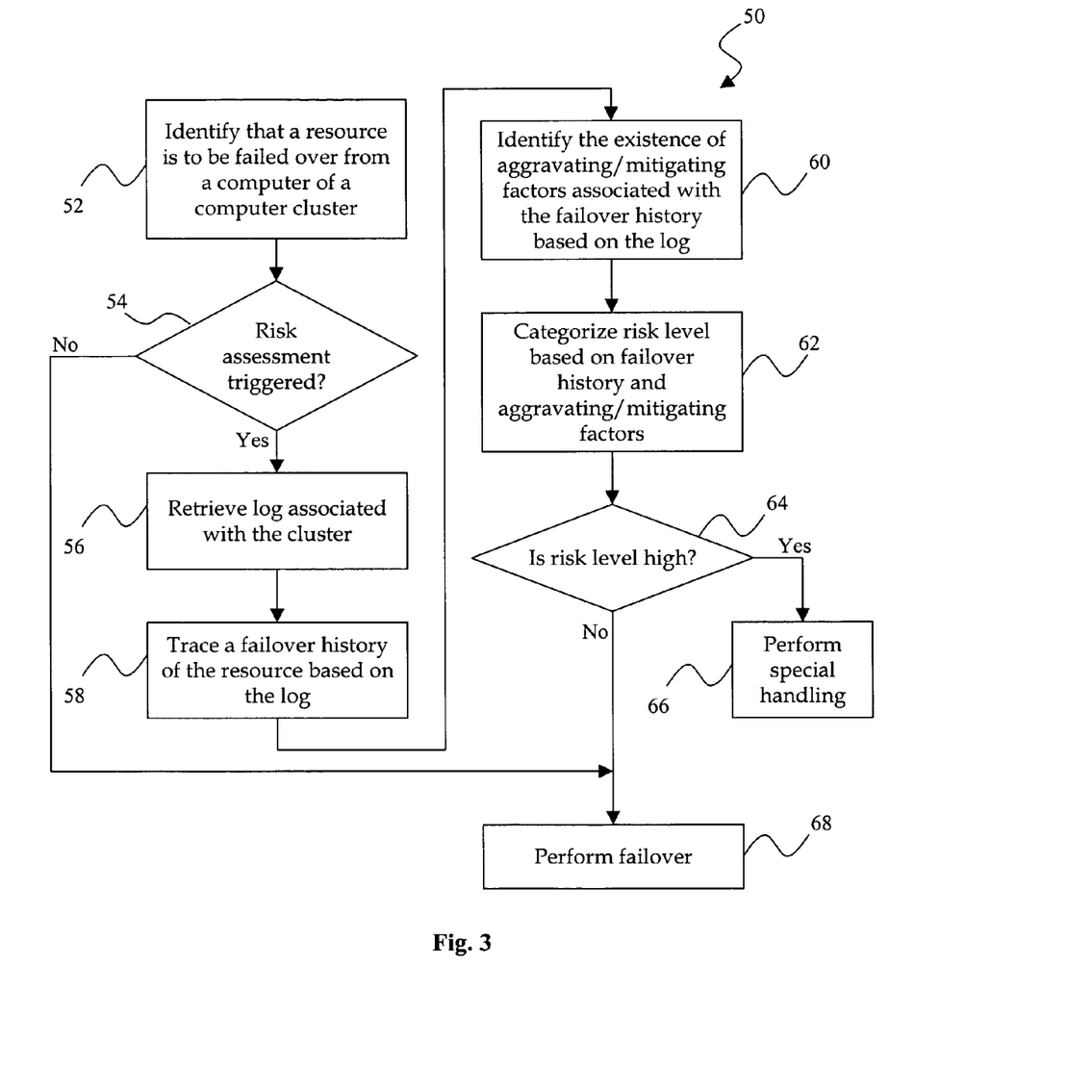
FIG. 3 is a flowchart of a more specific example of the method of FIG. 1.
Figure 4:
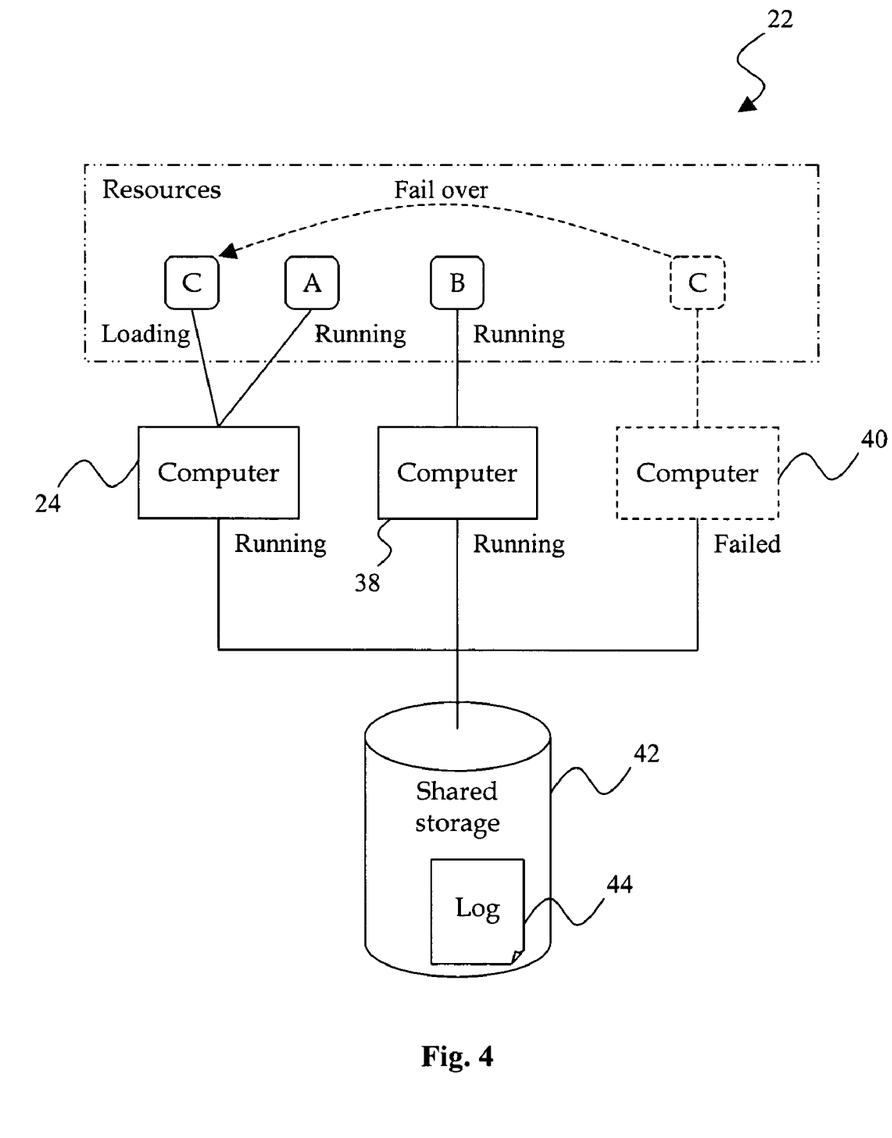
FIG. 4 is a diagram of an exemplary environment in which the method of FIG. 3 may be executed.

Referring now to FIG. 3 and with additional reference to FIG. 4, in another embodiment, a method 50 may be used within a computer cluster environment, such as that illustrated in FIG. 4 (which may be similar to environment 22 of FIG. 2), to prevent a fault from disabling the entire cluster. As illustrated in FIG. 4, computer 24 is in the running state and is running resource A, computer 38 is in the running state and is running resource B, and computer 40 is in the failed state (e.g., crashed) and resource C is to be failed over to another computer of the cluster (computer 24 in the present example). It is understood that the method 50 may be applicable regardless of how resources are divided among the computers.

In step 52 of FIG. 3, the method 50 identifies that resource C is to be failed over from computer 40. The selection of computer 24 as the computer to which resource C should be failed over may be achieved in many ways known in the art (e.g., based on availability, processing capacity, estimated start and/or end times of the resources A and B, or a predefined selection routine such as round robin). In step 54, a determination is made as to whether a risk assessment has been triggered (i.e., whether a predefined risk threshold has been reached). For example, if the total number of computers in a running state in the cluster reaches a predefined minimum number of computers or a percentage of computers in the cluster, the risk assessment may be triggered. If the risk assessment is not triggered, the method continues to step 68, where the failover is performed.

If the risk assessment is triggered (as determined in step 54), the log 44 is retrieved from the shared storage 42 in step 56. As previously described, the log contains a running history of the resources and computers in the cluster. In the present example, the log may contain the following information:

| | |
|---|---|
| At time 1: | Computer 24 is running. |
| At time 2: | Computer 38 is running. |
| | Computer 40 is running. |
| At time 3: | Resource A is running on computer 24. |
| | Resource B is running on computer 38. |
| | Resource C is running on computer 40. |
| At time 4: | Computer 40 fails. |
| At time 5: | Resource C is loading on computer 24. |
| | Resource B is running on computer 38. |
| | Resource A is running on computer 24. |

As can be seen in the log, computer 40 failed at time 4 and resource C began loading (or was designated to begin loading) on computer 24 at time 5.

In step 58, the failover history of resource C is traced through the log until the end of the log or a preset condition is reached (e.g., only trace back for 24 hours). Although the preceding log section illustrates only a single failover occurrence of resource C, it is understood that resource C may have failed over multiple times in some scenarios.

In step 60, for each occurrence of failover involving resource C, any existing mitigating or aggravating factors are identified. Exemplary mitigating factors may include the number of times (R) that the resource C entered the running state before failover occurred and the number of times (L) there was at least one other resource in the loading state during the failover of resource C. An additional mitigating factor may include the number of running computers remaining in the cluster (N). It is understood that referring to a factor as mitigating or aggravating is for purposes of illustration only, and that a factor may be viewed as either mitigating or aggravating based on the perspective from which it is viewed.

In step 62, the risk level of loading the resource is categorized based on the total number of failovers (F) of the resource C and the mitigating factors R, L, and N. In the present example, based on the log section above, the resource C may be associated with C:N=2, F=1, L=0, and R=1. Using this information, the method categorizes the risk level as low, medium, or high. In the present example, F is treated as the major indicator of the risks, while R, L, and N are generally treated as mitigating factors. As in the present example, if there is only one failover (F=1), the risk level is considered low unless there is only one computer remaining (N=1), in which case the risk level is medium. As there are two computers remaining, the risk level is considered low.

Table 1 (below) illustrates an exemplary risk assessment matrix for F=1 with two computers running (N=2). Note that N may be viewed as either a mitigating factor (if N>1) or an aggravating factor (if N=1, the risk level is raised).

TABLE 1

(Risk Assessment Matrix when F = 1 and N > 1)

| | R | |
|---|---|---|
| L | 0 | 1 |
| 0 | Medium | Low |
| 1 | Low | Low |

In step 64, a determination is made as to whether the risk level is above or below a certain threshold (e.g., whether the risk level is high). If the risk level is high, the method 50 moves to step 66 and performs special handling of the resource instead of loading it. The special handling may include processing the work in a special (e.g., secure) environment, marking the task as unavailable for failover, or quarantining the task. As will be described later, special handling techniques (such as isolating tasks by source or application type) may also be used to prevent attacks from disabling the cluster. In the present example, as the risk level is low, the method 50 moves to step 68 and performs the failover is performed.

With reference to Table 2 (below), an exemplary risk assessment matrix is illustrated for a scenario in which there are two failovers (F=2). In this case, the risk level is considered to be medium unless the resource had difficulty reaching the running state or there is only one computer remaining (N=1), in which case the risk level is high.

TABLE 2

(Risk Assessment Matrix when F = 2 and N > 1)

| | R | | |
|---|---|---|---|
| L | 0 | 1 | 2 |
| 0 | High | High | Medium |
| 1 | High | Medium | Low |
| 2 | Medium | Low | Low |

With reference to Table 3 (below), an exemplary risk assessment matrix is illustrated for a scenario in which there are three failovers (F=3). In this case, the risk level is considered to be high unless the resource reached the running state two or three times (R>=2) and at least one other resource was in the loading state two or three times (L>=2). The risk level is also considered high if there is only one computer remaining (N=1).

TABLE 3

(Risk Assessment Matrix when F = 3 and N > 1)

| | R | | | |
|---|---|---|---|---|
| L | 0 | 1 | 2 | 3 |
| 0 | High | High | High | High |
| 1 | High | High | Medium | Medium |
| 2 | High | Medium | Low | Low |
| 3 | High | Medium | Low | Low |

If there are four or more failovers (F>=4), the risk level is considered high unless there is at least one other resource in the loading state every time (L=F) and the resource being assessed reached the running state at least once (R>=1), in which case the risks are considered as medium. As before, the risk level may be considered high if there is only one computer remaining (N=1).

It is understood that the risk assessment may vary based on many different factors. For example, the total number of computers in a cluster, a reliability level defined for the cluster, and other factors may be used to customize a particular risk assessment strategy for a given cluster. This provides flexibility in how different clusters handle risk and may be used to modify acceptable risk levels based on a cluster's customary processing tasks. Furthermore, a given resource may be assigned a risk level or a risk level modifier (e.g., an aggravating or mitigating factor) within the cluster so that the risk level of the resource is weighted when undergoing a risk assessment. For example, a critical resource may be given additional failover "chances," while a non-critical resource may be given fewer failover chances.

Figure 5:
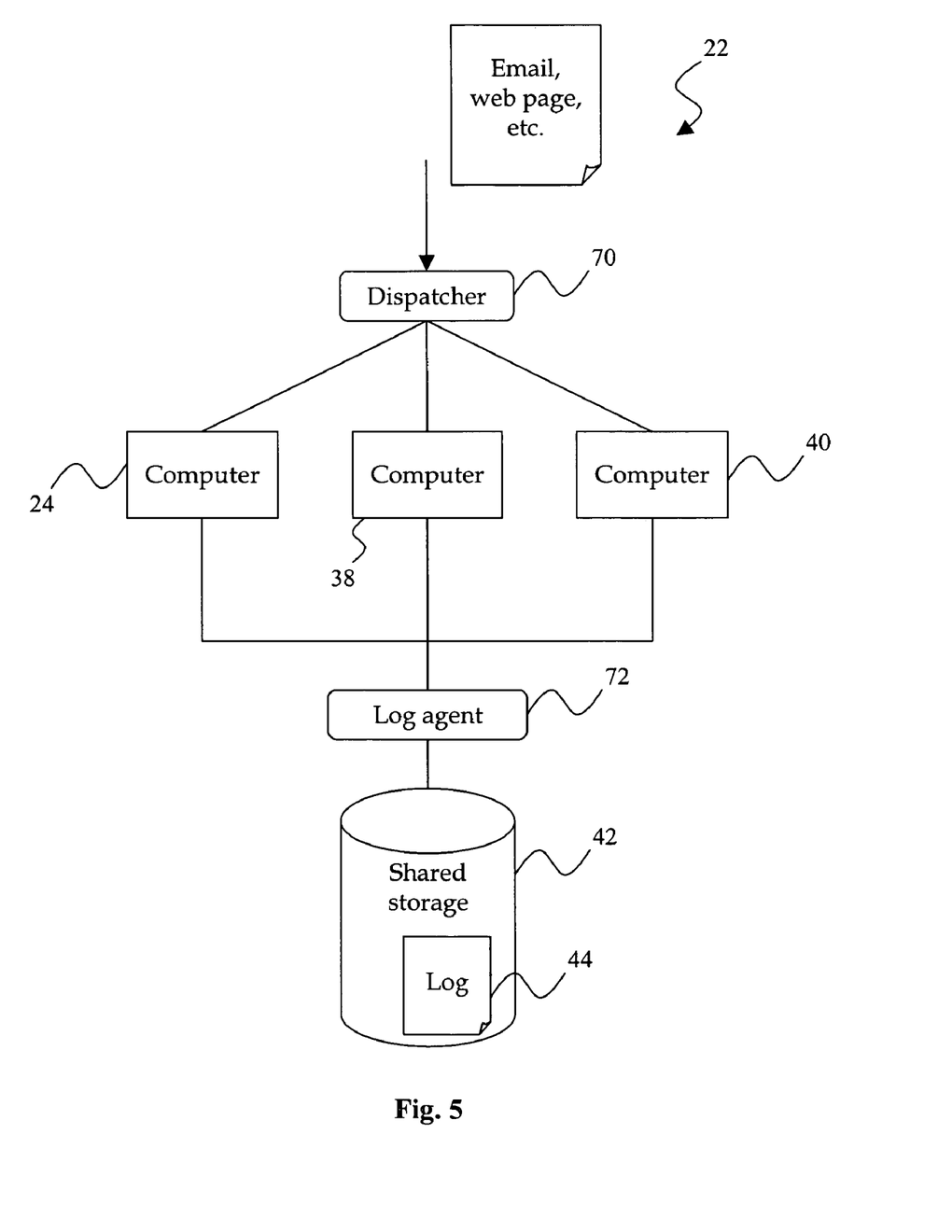
FIG. 5 is a diagram of another exemplary environment in which the method of FIG. 3 may be executed.

Referring now to FIG. 5, in another embodiment, the computer collaboration environment 22 is illustrated in a configuration that may be used for processing incoming email, web page requests, etc. As will be described, the method 50 of FIG. 3 may be used to conduct one or more assessments prior to failover or loading a task (or other resource). For example, the method 50 may assess a task based on safety and security issues, as well as cluster status and the processing history of the task being assessed. Based on the assessment, the task may be treated normally or subjected to special handling. The special handling may include processing the work in a special (e.g., secure) environment, marking the task as unavailable for failover, or quarantining the task. As will be described, special handling techniques (such as isolating tasks by source or application type) may also be used to prevent attacks from disabling the cluster.

Incoming tasks are directed to one of the computers 24, 38, or 40 by a dispatcher 70. In the present example, the task being performed by each computer involves email processing. Each computer may be responsible for a portion of the email processing. When one computer has completed its work, it may ask for additional work. When one computer fails, others will pick up the unfinished work and carry it out. The computers may also exchange status information through their communication channels, and record the information for future references either locally or in the log 44 via a log agent 72. The log agent 72 may also make updates to the log upon the occurrence of various events (e.g., when a computer or task changes state). Although illustrated separately, it is understood that the dispatcher 70 and/or log agent 72 may be part of one or more of the computers 24, 38, and 40.

In step 52, a task is identified that is to be failed over. In step 54, the risk assessment is triggered (in the present example) and, in steps 56 and 58, the log 44 is retrieved and the failover history of the task is traced. In the present example, the log contains the following information:

| At time 1: | Computer 24 starts processing mail 01. |
|---|---|
| At time 2: | Computer 38 starts processing mail 02. |
| At time 3: | Computer 24 finishes processing mail 01. |
| At time 4: | Computer 40 starts processing mail 03. |
| At time 5: | Computer 38 fails. |

-continued

| | |
|---|---|
| At time 6: | Computer 24 starts processing mail 02. |
| At time 7: | Computer 40 finishes processing mail 03. |
| At time 8: | Computer 24 fails. |

As can be seen in the log, both computer 24 and computer 38 failed while processing mail 02. The method 50 traces this information through the log and then moves to step 60, where any aggravating or mitigating circumstances are identified. In the present example, it is noted that only one computer in the cluster is in the running state. In step 62, a risk level is assessed based on the log information and any other applicable factors. Such factors may include those previously described (e.g., number of computers remaining in the cluster, number of failovers, whether the task had reached the running state previously, or whether other tasks were loading), as well as other factors such as size of mail, security levels, type of failure, time to failure, etc.

In step 64, a determination is made as to whether the risk level is too high. As computer 40 is the only remaining computer in the cluster and the other computers failed while processing mail 02, the risk level is deemed to be too high to load the email on computer 40 and the method moves to step 66. In the present example, the special handling directs the computer 40 to set aside or quarantine mail 02 and move on to the next mail. While two of the three computers in the cluster are down, the system is still running at about one third of its capacity (assuming each computer has equal capabilities), which is better than a total system breakdown.

It is understood that a course of action may be decided prior to, or as part of, the performance of the special handling. For example, the course of action may be determined based on the assessed risk level. Higher risk levels may be associated with courses of action that ensure the integrity of the cluster (e.g., quarantine), while lower risk levels may allow the execution of a course of action that attempts to handle the task while still protecting the cluster (e.g., load the task into a secure environment).

Figure 6:
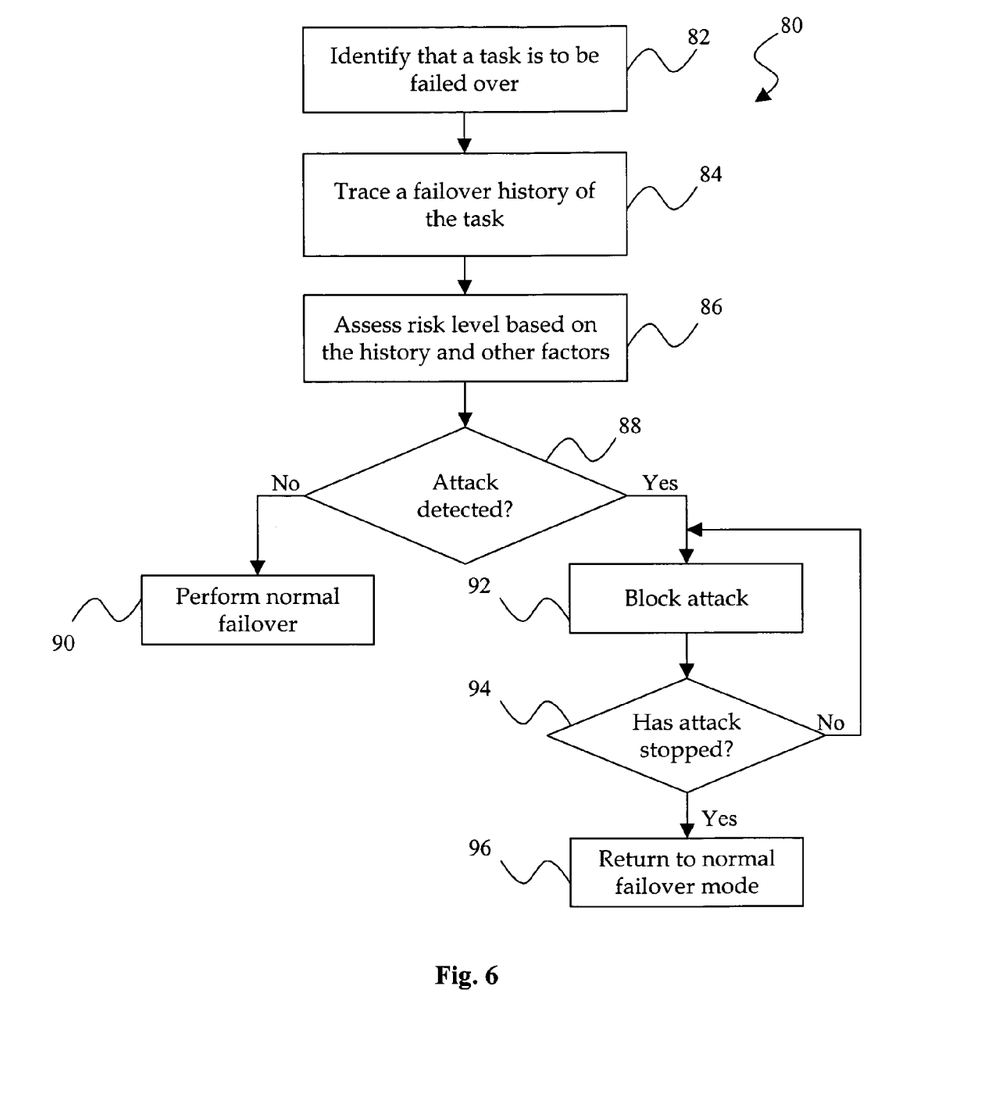
FIG. 6 is a flowchart of still another embodiment of a method for detecting and isolating faults in a computer collaboration environment.

In yet another embodiment, a method 80 may be used to defend against attacks. For example, a computer collaboration system (such as the computer collaboration environment 22 of FIG. 5) may be configured with several computers working together as a web server with the work divided by the internet protocol (IP) address of an incoming request. If someone launches a "denial-of-service" (DOS) attack against the web server, some of the computers may be saturated by the malicious requests. However, the method 80 enables the remaining computers to take over the services and stop serving the requests coming from the malicious sources once the risk assessment is performed and a determination is made that the attacks originate from a particular source (or sources). It is noted that this functionality may be integrated with the method 50 as part of, for example, the special handling of step 66.

In step 82, a task is identified that is to be failed over. For example, the task may be to serve a web page in response to a request from outside the cluster. In step 84, a failover history of the task is traced (e.g., based on a log) and failovers related to associated tasks may be identified. For example, the request to be handled in the present task may originate from address 11.00.00.11. The trace may examine the log and identify that a large number of requests from address 11.00.00.11 have resulted in failovers from other computers of the cluster. Accordingly, in step 86, a risk assessment may use this information to identify whether failover should occur. It is understood that the risk assessment may include various methods for identifying attacks (such as identifying an unusually large number of repetitive requests from a single source or a small number of sources), and that these methods may be tailored to the functionality of a particular cluster.

In step 88, if an attack is not detected, the method 80 continues to step 90, where a normal failover may be performed. It is understood that, in some examples, the risk assessment of step 86 may be used to prevent failover even if an attack is not occurring. For example, a risk level may be evaluated as previously described with respect to the method 50 of FIG. 3 in order to prevent, for example, a corrupted file from crashing each computer of the cluster as it repeatedly fails over. Accordingly, the risk assessment may be used for multiple purposes and method 80 may be integrated with one or more of the previously described methods for additional functionality.

In step 92, if an attack is detected, the attack is blocked in a manner that may depend on the configuration of the cluster. For example, if the requests originate from address 11.00.00.11 and the cluster is structured to handle requests by source address, then future requests from that address may be ignored until a determination is made that the attack has ended.

In another embodiment, the web server may be configured to provide FTP, TELNET, and other services. In this scenario, the work may be divided by type (e.g., HTTP, FTP, TELNET). If a similar DOS attack occurs, the computers hosting HTTP services may be saturated by the number of requests. However, the remaining computers may stop providing HTTP services while keeping the remaining services available once the risk assessment is performed and a determination is made that the attacks are HTTP-based. Future HTTP requests may be ignored until a determination is made that the attack has ended.

In step 94, a determination may be made as to whether the attack has stopped. If it has not stopped, the method 80 may return to step 92 and repeat steps 92 and 94 until the attack stops. Once it is determined that the attack has stopped, the method 80 may return to normal failover mode for the address or service being blocked.

It is noted that the risk assessment approaches described above may be implemented prior to first loading a resource or task (e.g., before failover is needed). For example, a computer (or another software or hardware component such as a dispatcher) may evaluate a resource's or task's history prior to loading the resource or task. For example, if the resource or task is historically unstable or causes problems, it may not be loaded unless a certain percentage of the computers of a cluster are running or it may be loaded onto a computer that is not currently loading another task. Accordingly, various methods may be implemented based on a particular risk assessment.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Therefore, the claims should be interpreted in a broad manner, consistent with the present disclosure.

What is claimed is:

1. A method for minimizing breakdown in a computer cluster containing a plurality of computers, wherein a resource is to be failed over from a first computer of the plurality of computers, the method comprising:
   identifying that the first computer has failed while running the resource;
   tracing a failover history of the resource based on a log containing a history of the resource and the plurality of computers;
   identifying the existence of mitigating factors associated with the failover history based on the log, wherein identifying the existence of mitigating factors includes at least one of:
      identifying a number of times (L) that another resource was loading on each computer from which the resource was failed over; and
      identifying a number of times (R) that the resource entered a running state; and
   determining whether to load the resource onto a second computer of the plurality of computers based on the failover history and mitigating factors.

2. The method of claim 1 wherein tracing the failover history includes identifying a total number of times (F) the resource has failed over.

3. The method of claim 2 further comprising identifying a number of running computers (N) remaining in the cluster.

4. The method of claim 3 wherein determining whether to load the resource includes assessing a risk level based on F, L, R, and N.

5. The method of claim 1 further comprising determining whether a triggering event has occurred, wherein the failover history is not traced unless the triggering event has occurred.

6. The method of claim 5 wherein the triggering event is based on a minimum number of available computers remaining in the cluster.

7. The method of claim 1 further comprising quarantining the resource if a determination is made to not load the resource.

8. A computer readable medium comprising a plurality of computer-executable instructions for use with a cluster containing at least first and second computers, the instructions including:
   instructions for identifying that a resource should be failed over from the first computer to the second computer;
   instructions for examining a history of the resource's execution within the cluster; wherein the instructions for examining the history include instructions for identifying at least one of a number of times (F) the resource has failed over; a number of times (L) that another resource was loading on each computer from which the resource was failed over; and a number of times (R) that the resource entered a running state; and
   instructions for failing the resource over to the second computer only if a risk assessment based on the history indicates that a risk level of loading the resource does not exceed an acceptable risk threshold.

9. The computer readable medium of claim 8 further comprising instructions for examining the history until either the end of the log is reached or a preset condition is reached.

10. The computer readable medium of claim 8 further comprising instructions for determining a course of action to be followed if the resource is not failed over to the second computer.

11. The computer readable medium of claim 10 wherein the course of action is to quarantine the resource.

12. The computer readable medium of claim 10 wherein the course of action is to process the resource on a secure computer that will not affect the cluster.

13. The computer readable medium of claim 8 wherein the risk assessment is based on the identified F, L, and R.

14. The computer readable medium of claim 13 further comprising instructions for identifying a number of running computers (N) remaining in the cluster, wherein the risk assessment is also based on N.

15. The computer readable medium of claim 8 further comprising instructions for assigning the resource a weighted risk value to be used in the risk assessment.

16. A method for preventing breakdown of a computer cluster, the method comprising:
   identifying that a task should be failed over from a first computer of the cluster to a second computer of the cluster;
   determining whether a risk assessment has been triggered;
   retrieving a log containing a running history of the cluster if the risk assessment has been triggered;
   identifying a number of times (F) the task has failed over based on the log;
   examining the log to determine at least one of a number of times (L) that another task was loading on each computer when the task was failed over and a number of times (R) that the task has entered a running state;
   calculating a risk level based on F, L, and R; and
   loading the task onto the second computer only if the risk level is below a predefined risk threshold.

17. The method of claim 16 further comprising identifying a number of running computers (N) remaining in the cluster, wherein the risk assessment is also based on N.

18. The method of claim 16 wherein the task is servicing a request from a computer outside of the cluster.

19. A method for preventing breakdown of a computer cluster, the method comprising:
   identifying that a task should be failed over from a first computer of the cluster to a second computer of the cluster;
   examining a history of the cluster to determine whether the task is associated with a current attack on the cluster; and
   failing over the task to the second computer only if the task is not associated with a current attack.

20. The method of claim 19 further comprising:
   assessing a risk level based on the history; and
   if no attack is occurring, failing over the task only if the risk level indicates that loading the resource does not exceed an acceptable risk threshold.

21. The method of claim 19 further comprising dividing tasks entering the cluster by origin, wherein further tasks received from the same origin as the task needing to be failed over will not be loaded if the task is associated with a current attack.

22. The system of claim 19 further comprising dividing tasks entering the cluster by application type, wherein further tasks of the same application type as the task needing to be failed over will not be loaded if the task is associated with a current attack.

23. The method of claim 19 further comprising determining whether an attack has stopped and loading tasks originally associated with the attack if the attack has stopped.

24. A computer collaboration system comprising:
   first and second computers;

a shared storage accessible by the first and second computers containing a log of the system; and a plurality of computer-executable instructions for:

identifying that a task should be failed over from the first computer to the second computer;

examining the log to trace a history of the task's execution within the system wherein the examining the log includes at least one of identifying a number of times (L) that another resource was loading on each computer from which the task was failed over; identifying a number of times (R) that the task entered a running state; and identifying a number of running computers (N) remaining in the system; and     failing the task over to the second computer only if a risk assessment based on the history indicates that a risk level of loading the task does not exceed an acceptable risk threshold.

25. The system of claim 24 wherein examining the log includes identifying a total number of times (F) the task has failed over.

26. The system of claim 24 further comprising instructions for dividing tasks entering the system by source, wherein further tasks received from the same source as the task needing to be failed over will not be loaded by the system if the risk level exceeds the acceptable risk threshold.

27. The system of claim 24 further comprising instructions for dividing tasks entering the system by application type, wherein further tasks of the same application type as the task needing to be failed over will not be loaded by the system if the risk level exceeds the acceptable risk threshold.

28. A computer cluster system comprising:

means for identifying that a first computer of the cluster has failed while running a task;

means for tracing a failover history of the task;

means for identifying the existence of mitigating factors associated with the task, wherein the means for identifying the existence of mitigating factors includes at least one of:

means for identifying a number of times (L) that another resource was loading on each computer from which the resource was failed over; and     means for identifying a number of times (R) that the resource entered a running state; and means for determining whether to load the task onto a second computer of the cluster based on the failover history and mitigating factors.

\* \* \* \* \*